Patented May 13, 1952

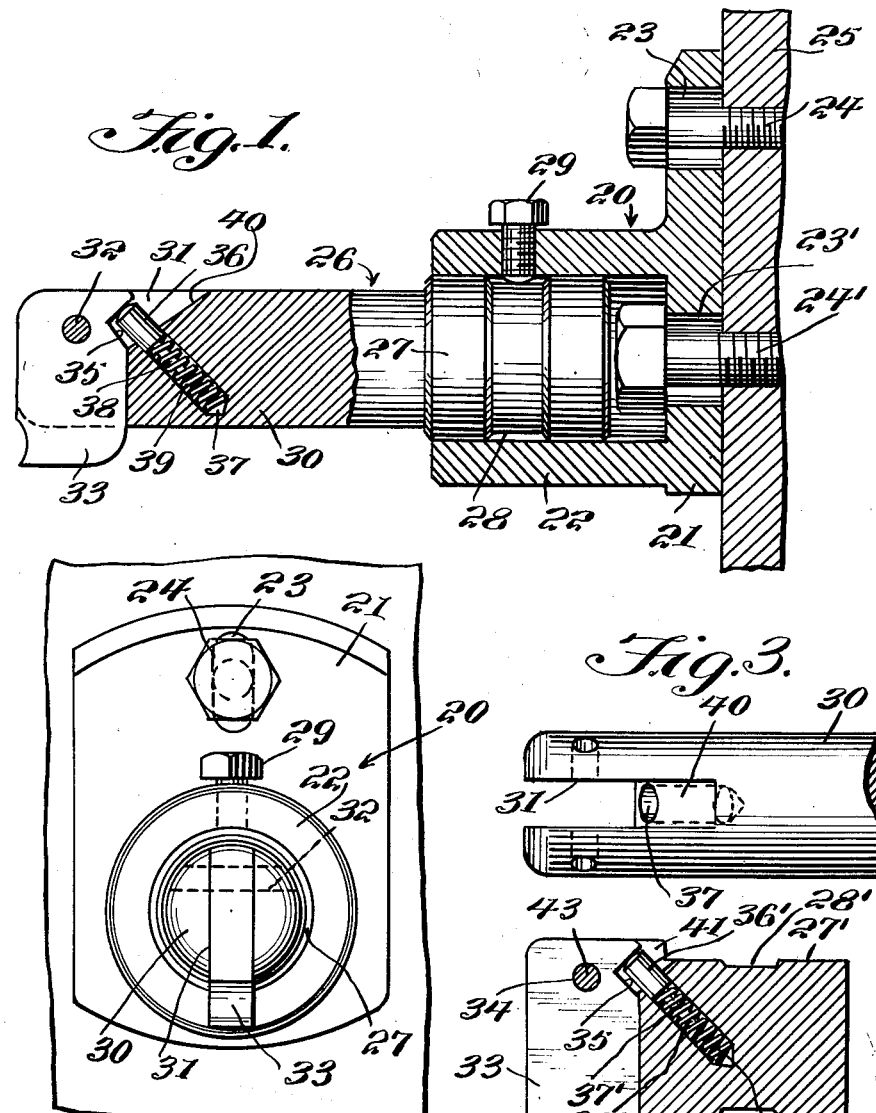

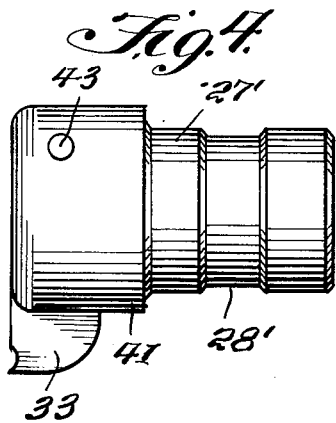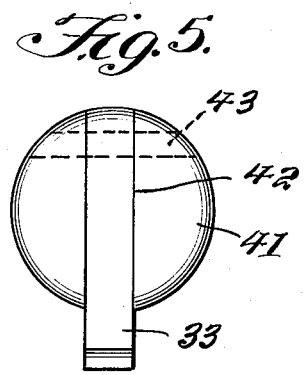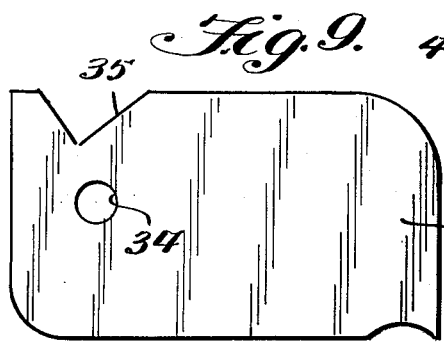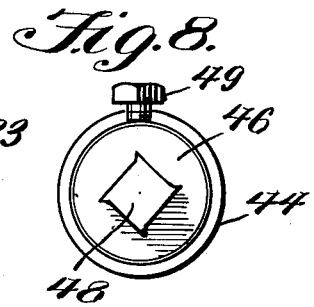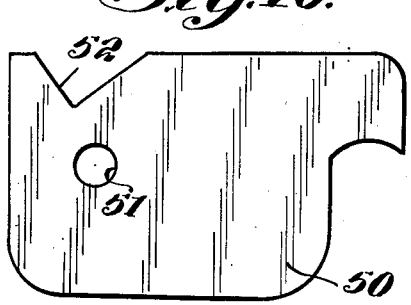

2,596,695

UNITED STATES PATENT OFFICE 2,596,695

UNIVERSAL KEYWAY AND SLOTTER ATTACHMENT

Spencer R. Keller, Handley, W. Va., assignor of one-half to Marathon Coal Bit Company, Incorporated, Montgomery, W. Va., a corporation of West Virginia Application June 25, 1947, Serial No. 756,868

1 Claim. (Cl. 90—52)

This invention relates to an attachment for use with machine tools, which is especially adapted for slotting, broaching, forming or shaping internal and external keyways or other similar operations.

An object of the invention is to provide a universal keyway and slotting attachment which is adapted to be attached to the reciprocating head of a machine tool.

Another object of the invention is to provide a tool of this character having an arbor provided with an enlarged end portion which is mounted on the machine tool by means of a holder which permits angular adjustment of the arbor for the cutting and shaping of keyways.

With the above and other objects and advantages in view, the invention consists of the novel details of construction, arrangement and combination of parts more fully hereinafter described, claimed and illustrated in the accompanying drawings in which:

Figure 1 is a sectional view of an embodiment of the invention;

Figure 2 is a front end view thereof;

Figure 3 is a detailed plan view of the forward end of the arbor with the cutter removed;

Figure 4 is an elevational view of another form of the invention;

Figure 5 is an end view thereof;

Figure 6 is a longitudinal sectional view of Figure 4;

Figure 7 is an elevational view of another form of the invention;

Figure 8 is an end view thereof;

Figure 9 is an elevational view of one form of cutter and

Figure 10 is an elevational view of another form of cutter.

Referring more in detail to the drawings, the reference numeral 20 designates a holder which comprises a plate 21 having the tubular seat or sleeve 22 formed integral therewith. The plate 21, at the top thereof, is provided with an elongated slot 23 to receive the bolt 24, and the plate, centrally of the seat or sleeve 22, is provided with a similar slot 23' to receive the bolt 24', and the bolt passing through the plate secures the holder to the reciprocating part or head 25 of a machine tool, not shown.

The tool or cutter 26 comprises the circular head 27 which is annularly grooved at 28 to receive the set screw 29 mounted in the seat or sleeve 22, whereby the head is rotatably secured within the sleeve or seat.

In Figure 1, the head is provided with the circular extension 30 having the bifurcated end apertured at 31, through which transversely extends the pin 32 for the pivotal mounting of the cutter 33. The cutter is mounted by means of the opening 34 therein, and rearwardly of the opening 34, on the rear edge of the cutter, there is a notch 35 which engages the spring pressed plunger 36 mounted in the inclined cavity 37 in the extension 30. The plunger is provided with a stem 38 on which is mounted the coil spring 39 for the tensioning thereof. The plunger 36 extends outwardly of the cavity 37, the mouth of which communicates with the inclined bottom 40 of the bifurcation. The plunger 36 engages the notch 35 of the cutter 33 to hold the cutter in cutting position, and the spring and plunger eliminate cutting drag on the reverse stroke.

In Figure 4, the head 27' is provided with the annular groove 28' but instead of the extension 30, the holder is provided with the enlarged circular head 41 which is provided with the slot 42. A pin 43, extending crosswise of the slot pivotally mounts the cutter 33 in the slot, and the cavity 37' in the head 27' seats the plunger 36' and its stem 38' and the spring 39' therein. The plunger 36' engages the notch 35, in the cutter 33, outwardly of the inclined bottom 43 of the slot 41.

In Figure 7, the head 44 is provided with the annular groove 45, and a short circular extension 46 which, together with the head 44, is centrally bored at 47 to receive the cutter 48 and a set screw 49 in the extension 46 retains the cutter in the bore 47.

In Figure 10, there is shown another type of cutter 50 having the opening 51 and notch 52 which may be substituted for the cutter 33.

With the head mounted for complete rotation in the seat 22 of the holder, any shape or plurality of keyways or slots can be cut on any desired degree within a circle, a decided advantage over previous tools of this character.

The tool can be used to cut up to a shoulder, or any other type of abutment on a piece of work being machined, since the cutter can be flush with or extend beyond the forward end of the element in which it is mounted.

With the pivot pin for the cutter in line with the cutting edge thereof, all tool chatter is eliminated on wide faced cutting, and the cutters are interchangeable by removal of the pivot pin.

The tool shown in Figure 1 is used for internal cutting, while the tool shown in Figure 4 is used for external cutting. The cutters shown in Figures 9 and 10 are used for external cutting, while the tool shown in Figure 7 is used for internal cutting.

It is believed that from the foregoing description, the structure and operation of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

In a device of the character described, a holder including a plate provided with an elongated slot, a securing element extending through said slot and adapted to secure the plate to a supporting structure, an open tubular sleeve formed integrally with said plate, there being an opening in said plate communicating with the opening in the sleeve, a bolt extending through said opening and adapted to extend into the supporting structure, a tool including a cylindrical head having a transverse annular groove arranged exteriorly and centrally therein, a set screw carried by said sleeve and engageable in said groove whereby said head is rotatably adjustable in said sleeve, cutter supporting means on said tool, a cutter carried by said means, and cutter-retaining means carried by said supporting means to retain said cutter in cutting position.

SPENCER R. KELLER.

REFERENCES CITED

The following references are of record in the file of this patent:

UNITED STATES PATENTS

| Number | Name | Date |
| --- | --- | --- |
| 81,183 | Linton | Aug. 18, 1868 |
| 667,877 | Haines | Feb. 12, 1901 |
| 1,869,240 | Edson | July 26, 1932 |
| 2,043,596 | Rovick | June 9, 1936 |
| 2,123,788 | McNaughton | July 12, 1938 |
| 2,167,014 | Vanderber | July 25, 1939 |